United States Patent [19]

Valley et al.

[11] Patent Number: 4,674,758
[45] Date of Patent: Jun. 23, 1987

[54] SHOPPING CART CHILD SUPPORT DEVICE

[76] Inventors: Charles R. Valley; Patricia A. Valley, both of 2091 Mississippi Dr., Xenia, Ohio 45385

[21] Appl. No.: 779,711

[22] Filed: Sep. 24, 1985

[51] Int. Cl.$^4$ ............................................. B62B 11/00
[52] U.S. Cl. .............................. 280/33.99 B; 297/487
[58] Field of Search ................ 280/33.99 B, 33.99 A, 280/33.99 R, 47.38; 297/219, 487, 250, 229; 108/44, 49, 90, 91; 5/507

[56] References Cited

U.S. PATENT DOCUMENTS

| | | | |
|---|---|---|---|
| 1,452,911 | 4/1923 | Gronsdahl | 297/487 |
| 2,418,731 | 4/1947 | Seitz | 297/250 |
| 2,979,121 | 4/1961 | Gates | 297/487 |
| 3,042,032 | 7/1962 | Vogel | 280/33.99 B |
| 3,070,384 | 12/1962 | Buczak | 280/33.99 |
| 3,159,424 | 12/1964 | Theriault | 297/487 |
| 3,184,248 | 5/1965 | Hummer | 280/33.99 |
| 3,335,434 | 8/1967 | Gamon | 5/507 |
| 3,424,497 | 1/1969 | Brilmyer et al. | 297/488 |
| 4,108,489 | 8/1978 | Salzman | 297/37 |
| 4,204,695 | 5/1980 | Salzman | 280/33.99 B |
| 4,324,430 | 4/1982 | Dimas, Jr. et al. | 297/250 |
| 4,403,807 | 9/1983 | Wilkinson et al. | 297/217 |
| 4,416,462 | 11/1983 | Thompson | 280/33.99 B |

FOREIGN PATENT DOCUMENTS 2729319 1/1979 Fed. Rep. of Germany ...... 297/487

Primary Examiner—David M. Mitchell
Attorney, Agent, or Firm—Fredric L. Sinder; Donald J. Singer

[57] ABSTRACT

A child support structure fits inside the child seat portion of a typical shopping cart. The child support has two primary elements; a horizontal platform or table that extends across the top portion of the shopping cart seat at approximate chest height, restraining the child from falling within or from falling or climbing out of the shopping cart seat; and, an upright wall-like teething guard to prevent the child from contacting parts of the shopping cart with his or her teeth or mouth. The preferred embodiment is made from a sheet of stiff plastic which is cut out and bent to form a squared C shape platform with folded over side extensions for the legs and an upwardly turned portion of the closed side of the platform as the teething guard. The bottom portion of the legs are further bent to form tabs or feet for resting on the bottom ribs of the shopping cart seat, and the top portion of the teething guard is bent to form a lip.

10 Claims, 2 Drawing Figures

SHOPPING CART CHILD SUPPORT DEVICE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to the field of child support and restraint devices, and more particularly to a novel child support device designed to safely hold an infant child within a shopping cart child seat and to restrain the child from falling forward or to the side inside the cart seat, and from teething on the handle or other parts of the shopping cart.

The rear of a typical grocery shopping cart includes a section hinged at the bottom rear of the cart basket which can swing out to form a "mini-basket" open at the top. This mini-basket is used either as a convenient storage area for small items, or as a seat for a small child. The child sits in the mini-basket facing the rear of the cart with his or her legs extending through two openings formed by the purposely wide placement of several of the metal or plastic ribs forming the rear wall of the shopping cart.

The relatively large size and open design of a typical shopping cart child's seat makes it too easy for an active infant to fall forward or to the side within the seat causing injury. Older infants and toddlers can even climb or fall out of the cart. In addition, the child will frequently lean forward and teethe on the unsanitary handle or other parts of the shopping cart.

A recent six year study by the U.S. Consumer Products Safety Commission of injuries to children from shopping cart accidents showed 53,403 reported injuries requiring emergency room treatment, of which 40,910 were injuries to the head. Prior art designs for improved shopping cart child seats have been concerned either with making a more comfortable seat, or with using belts and straps to safely hold in very young infants unable to walk or sit up on their own, rather than with the problem of restraining curious and active infants and toddlers.

Examples of the prior art include U.S. Pat. Nos. 3,070,384 to Buczak, and 3,184,248 to Hummer, both of which are simply more comfortable hammock-type designs for a shopping cart child seat. Related to U.S. Pat. Nos. 4,108,489 and 4,204,695 to Salzman describe a collapsible child seat that fits into a shopping cart child seat and is able to more securely hold an infant and includes straps for additional protection. U.S. Pat. No. 4,324,430 to Dimas, Jr., et al. is for a cushioned infant carrier that is also designed to fit into and attach to a shopping cart child seat.

It is thus seen that there is a serious lack of and need for a shopping cart child seat support suitable for restraining the active infant.

It is, therefore, a principal object of the present invention to provide a child support device that will comfortably support an active infant in a shopping cart child seat and restrain the infant from falling over within the cart child seat or from climbing or falling out of the cart.

Another object of this invention is to prevent a child from teething on parts of the cart.

Yet another object of this invention is to provide a child support device for use in shopping carts that is lightweight, easy to transport, and convenient to use.

A significant feature of this invention is its universal design adapted to fit nearly all shopping cart child seats.

Another feature of this invention is that it is easily cleaned.

Yet another feature of this invention is that it allows nesting of one unit into another for convenient storage and shipping, and that units may be easily stacked to make them convenient to set out for use by customers at grocery and other stores.

A significant advantage of this invention is that it accomplishes its support and restraint objectives without the use of belts or other inconvenient or easily subverted means.

Another advantage of this invention is that the child feels comfortable and is provided a sense of security.

These and other objects, features and advantages of the present invention will become apparent as the detailed description of certain representative embodiments thereof proceeds.

SUMMARY OF THE INVENTION

In accordance with the foregoing principles and objects of the present invention, a novel child support device is described which restrains a child from falling within, or from climbing or falling out of, the child seat portion of a shopping cart by use of a horizontal platform, preferably of a squared-C shape, mounted on legs positioning the platform approximately 8.5 inches above the bottom of the child seat mini-basket.

The invention also includes inwardly turned tabs on the bottom of the legs to prevent the legs from slipping through the bottom ribs of the shopping cart seat.

The invention further includes the addition of a vertical barrier to the horizontal top of the child support to act as a teething guard.

DESCRIPTION OF THE DRAWINGS

The present invention will be more clearly understood from a reading of the following detailed description in conjunction with the accompanying drawings wherein.

DETAILED DESCRIPTION

Figure 1:
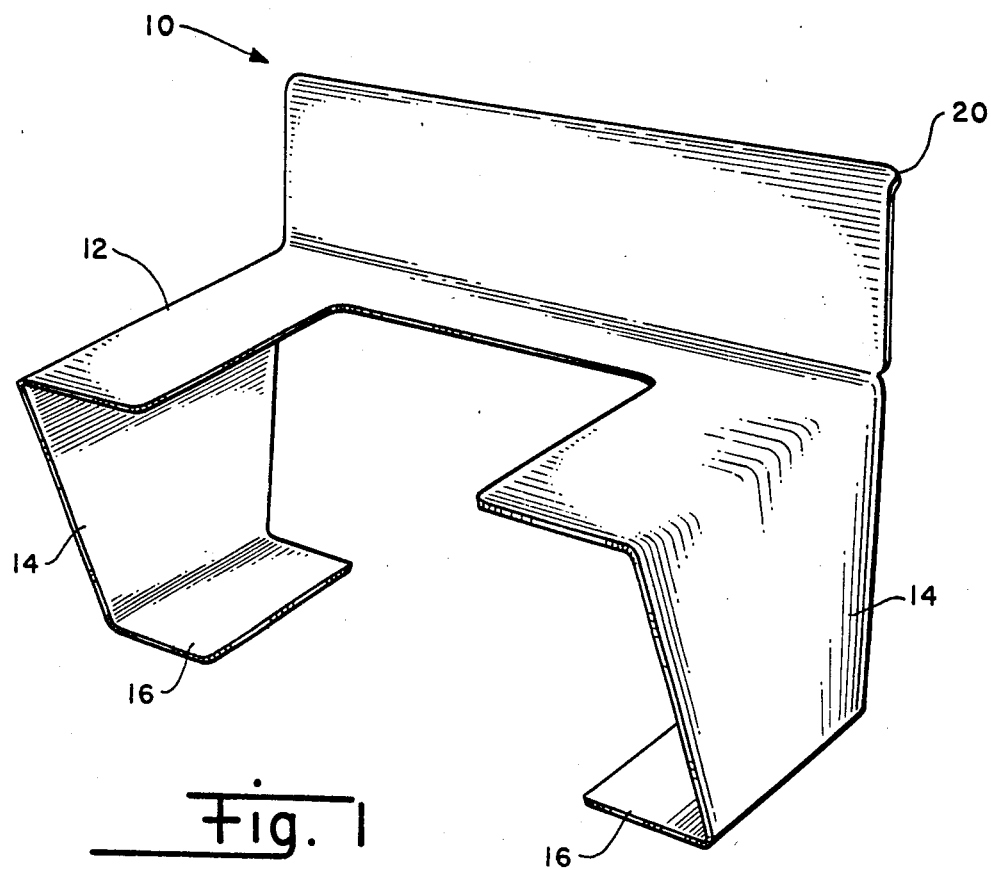
FIG. 1 is a perspective view of the present invention.

Referring now to FIG. 1 of the drawings, there is shown a perspective view of the preferred embodiment of the shopping cart child seat support 10. The child seat support 10 is formed of a stiff sheet material, such as an ABS thermoplastic, cut out and shaped as shown in the figure. The parts of the child support 10 are a horizontal platform 12, legs 14, leg tabs 16, a teething guard 18, and a teething guard lip 20. The horizontal platform 12 has a cutout of desired shape for the child's body. The cutout may be circular or other similar shapes, and is rectangular in this embodiment, giving the platform the shape of a squared C. The legs 14 are trapezoidally shaped extensions at right angles from the short sides of the platform 12 and have attached at further right angles inwardly directed tabs 16 which serve as feet for the legs 14. An upwardly turned portion of the platform 12 forms the teething guard 18 attached to the rear long side of the platform 12 and having a curved lip 20 on its upper edge along its length.

Figure 2:
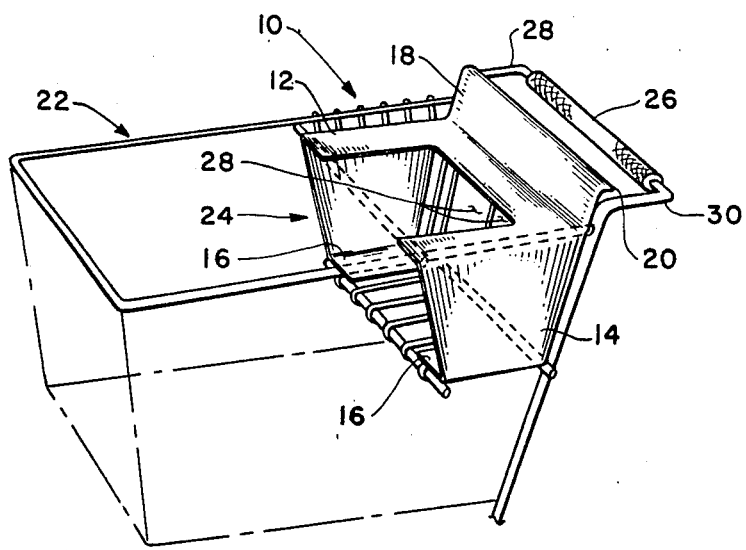
FIG. 2 is another perspective view of the present invention showing its placement inside a typical shopping cart.

FIG. 2 is a perspective view of the child support 10 installed in a typical shopping cart 22. This figure shows the in use relationship of the various parts of the child support 10 to a shopping cart child seat 24. The platform 12 is sized to just fit inside the inner circumference of the top of the child seat 24. The legs 14 position the platform 12 at a level about 8.5 inches above the bottom of the child seat 24, which is designed to be at the approximate chest height of the average six to twelve month old infant. This is typically slightly below the top perimeter rails of the child seat 24 opening. The teething guard 20 extends a few inches above the top rails of the child seat 24 and above the level of the shopping cart handle 26. The tabs 16 are long enough to support and hold the legs 14 over the ribs defining the bottom of the child seat 24.

In use, an infant able to sit up by his or her self, typically of the age six to twelve months, is first placed in the child seat 24 facing the rear of the shopping cart 22. The child's legs fit through the two openings 28 formed by the purposely wide placement of several of the ribs forming the rear of the shopping cart 22. The child's arms are raised slightly and the child support 10 is placed over the child's legs into the seat 24 opening so that the child fits into the cutout portion of the platform 12 with arms comfortably resting upon the platform 12. In this position, the child is free to move about, but is restrained by the platform from standing up or from falling within the child seat 24, or from climbing or falling out. The teething guard 18 is short enough so that the child can see over it, but prevents the child from leaning forward to teethe on the shopping cart handle 16 or the bar (not shown) that extends across the shopping cart handle arms 30 in some shopping cart designs. In use, the invention has shown that it not only restrains the child, but also encourages good posture.

The one piece design of the invention makes the child support 10 easy to manufacture. It will be seen by those with skill in the art that the design of this preferred embodiment is particularly suitable to such standard modifications as slightly changing the angle of the bend from the platform 12 to the legs 14 so that the distance between the legs 14 is greater across the rear of the child support 10 than across the front. This will allow a number of child supports to conveniently fit into each other to nest for shipping and storage. Similar modifications to the angle of the bend from the legs 14 to the tabs 16 may be made to facilitate nesting, or advantage may be taken of the springiness of the ABS thermoplastic to allow the tabs 16 to interlock one over the other when the child supports are nested. In its unmodified configuration, two child supports may be nested front to front by intertwining the tabs 16.

The design of this preferred embodiment also allows convenient stacking of child support units top to top and top to bottom. This facilitates the setting out of a number of child supports for general use of customers at grocery and other stores.

It is understood that certain modifications to the invention as described may be made, as might occur to one with skill in the field of this invention, within the scope of the claims. Therefore, all embodiments contemplated have not been shown in complete detail. Other embodiments may be developed without departing from the spirit of the invention or from the scope of the appended claims.

We claim:
1. A shopping cart, comprising:
   (a) a first basket;
   (b) a child seat structure defining a second basket disposed inside the first basket;
   (c) a horizontal platform having a squared C shape sized slightly smaller than the upper circumference of the child seat structure, wherein the platform has one unbroken long side and two unbroken short sides;
   (d) leg means positioning the platform about 8 inches to about 9 inches above the bottom of the child seat structure, the leg means comprising a substantially vertical pair of trapezoidally shaped sheet material attached at substantially right vertical angles to the unbroken short sides of the horizontal platform;
   (e) inwardly directed tabs attached to the bottom of each of the trapezoidally shaped sheets whereby the tabs prevent the leg means from slipping through the bottom of the child seat structure.

2. A shopping cart as described in claim 1, further comprising upright wall means connected to the outer edges of the long side of the horizontal platform in a direction substantially opposite from the leg means.

3. A shopping cart as described in claim 2, wherein the upright wall means comprise a rectangularly shaped sheet material having a rounded lip along its upper edge extending away from the direction of the horizontal platform.

4. A shopping cart, comprising:
   (a) a first basket;
   (b) a child seat structure defining a second basket disposed inside the first basket;
   (c) a horizontal platform having a squared C shape sized slightly smaller than the upper circumference of the child seat structure, wherein the platform has one unbroken long side and two unbroken short sides;
   (d) leg means positioning the platform about 8 inches to about 9 inches above the bottom of the child seat structure; and,
   (e) upright wall means connected to the outer edge of the long side of the horizontal platform in a direction substantially opposite from the leg means.

5. The shopping cart as described in claim 4, wherein the upright wall means comprise a rectangularly shaped sheet material having a rounded lip along its upper edge extending away from the direction of the horizontal platform.

6. A child support device for use in a shopping cart having a child seat structure in the shape of a basket, comprising:
   (a) a horizontal platform having a squared C shape sized slightly smaller than the upper circumference of the child seat structure, wherein the platform has one unbroken long side and two unbroken short sides;
   (b) leg means depending from the horizontal platform for positioning the platform above the bottom of the child seat structure at a position about 8 inches to about 9 inches above the bottom of the child seat structure, the leg means comprising a substantially vertical pair of trapezoidally shaped sheet material attached at substantially right vertical angles to the unbroken short sides of the horizontal platform;
   (c) inwardly directed tabs attached to the bottom of the leg means whereby the tabs prevent the leg means from slipping through the bottom of the child seat structure.

7. A child support device as described in claim 6, further comprising upright wall means connected to the outer edge of the long side of the horizontal platform in a direction opposite from the leg means.

8. A child support device as described in claim 7, wherein the upright wall means comprise a rectangularly shaped sheet material having a rounded lip along its upper edge extending away from the direction of the horizontal platform.

9. A child support device as described in claim 8, wherein the attachment of the leg means to the short sides of the horizontal platform is at an acute horizontal angle to the long side of the horizontal platform and the connection of the wall means to the horizontal platform is at an obtuse vertical angle to the long side of the horizontal platform, so that a plurality of child support devices will nest 10. A child support device for restraining a child seated in a shopping cart having a child seat structure in the shape of a basket, comprising:
 (a) horizontal platform means for restraining the child;
 (b) upright wall means for restraining the child from contacting other parts of the shopping cart with his head or mouth, the upright wall means attached to and supported by the horizontal platform means in a spaced relationship above the bottom of the child seat structure;
 (c) leg means depending from the horizontal platform; and,
 (d) inwardly directed tabs attached to the bottom of the leg means for preventing the leg means from slipping through the bottom of the child seat structure.

* * * * *